T. B. COLLINS
Jan. 26, 1932. Re. 18,340
SPEED BOAT AND BOAT HULL
Original Filed June 17, 1925
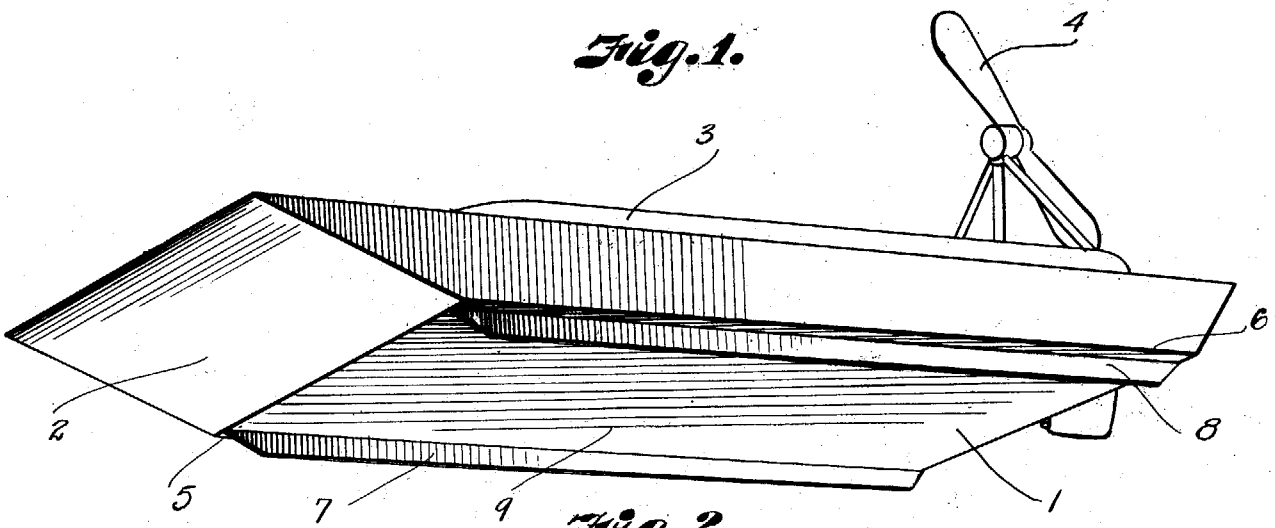
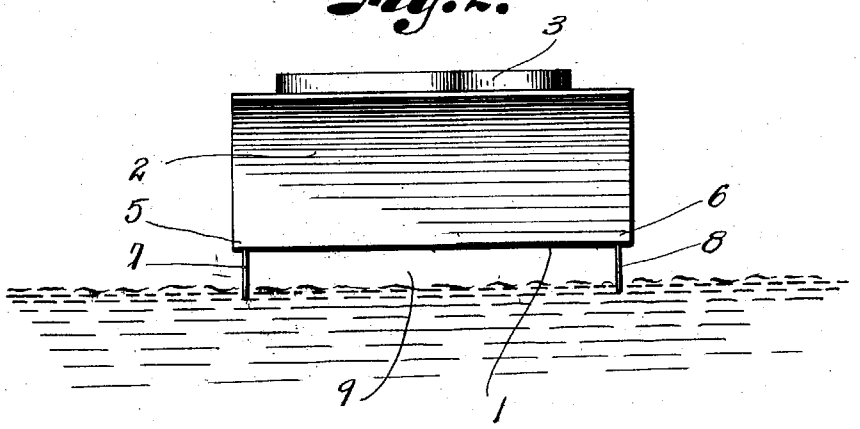
INVENTOR
T. B. Collins, dec'd.
by G. R. Collins, Administrator.
BY Arthur C. Gowns
ATTORNEY Reissued Jan. 26, 1932

Re. 18,340

UNITED STATES PATENT OFFICE

T. B. COLLINS, ALSO KNOWN AS TIMOTHY BANKER COLLINS, DECEASED, LATE OF DAYTONA, FLORIDA, BY GEORGE R. COLLINS, ADMINISTRATOR, OF KANSAS CITY, MISSOURI

SPEED BOAT AND BOAT HULL

Original No. 1,631,400, dated June 7, 1927, Serial No. 37,672, filed June 17, 1925. Application for reissue filed November 7, 1929. Serial No. 405,499.

This invention relates to speed boats and the primary object of the invention is to provide a boat which may be capable of being propelled over marshy waters where the waters contain considerable long grass and weeds. In certain parts of the country, particularly in the South, there are wide expanses of water where boats with deep draft cannot navigate so he provided a flat bottom boat with means for providing a cushion of air between the water and the bottom of the boat so that the boat when in action will be buoyed slightly above the water's surface.

The novel construction of the invention will be apparent by reference to the following description in connection with the accompanying drawings, in which Fig. 1 is a perspective view of the boat constructed in accordance with this invention, and Fig. 2 is an end view of the same.

The boat is shown as having a flat bottom 1 with an upturned bow 2. The boat may be provided with a coping 3 and a prepeller 4 driven by an appropriate mechanism may supply the necessary power. Near th respective edges 5 and 6 of the boat are two depending fins 7 and 8, running longitudinally of and supported by the bottom of the boat. The fins 7 and 8 are deep enough to provide an air pocket 9 which, when the boat attains sufficient speed, will cause the air to pack under the bottom 1 so as to have sufficient buoyancy to raise the boat above the surface of the water. Therefore, the boat when in action will be in the form of a hydroplane.

It is found that by providing the longitudinally depending fins so as to provide the air pocket; the boat can attain considerable speed, as much as fifty miles an hour, over marshy streams and water courses where ordinarily it would be difficult to propel a boat at all.

What is claimed and desired to be secured by Letters Patent is:

1. A boat having a smooth, flat, uninterruptd bottom, an inclined substantially plane faced bow merging therewith, and a pair of substantially parallel fins extending longitudinally of said bottom adjacent the side edges thereof and depending therefrom substantially perpendicular to said botom, said fins having bevelled forward ends, the edges of which lie in the plane of the inclined faced bow.

2. A boat having a smooth, flat, uninterrupted bottom, an inclined substantially plane faced bow merging therewith, and a pair of substantially parallel fins extending longitudinally of said bottom adjacent the side edges thereof and depending therefrom substantially perpendicular to said bottom, said fins having bevelled forward ends adjacent the junction of said bow and bottom, the edges of which lie in the plane of the inclined faced bow.

In testimony whereof I herewith this 1st day of November, 1929, affix my signature, at Kansas City, Missouri.

GEORGE R. COLLINS,
*Administrator of the Estate of T. B. Collins, Deceased.*